United States Patent
Honsinger

(10) Patent No.: US 6,665,418 B1
(45) Date of Patent: Dec. 16, 2003

(54) LINEAR PROJECTIVE DATA EMBEDDING

(75) Inventor: Chris W. Honsinger, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/452,823

(22) Filed: Dec. 1, 1999

(51) Int. Cl.[7] .................................................. G06K 9/00
(52) U.S. Cl. ...................................................... 382/100
(58) Field of Search ................................ 382/100, 250, 382/232, 276, 251, 252, 244; 380/54, 55

(56) References Cited

U.S. PATENT DOCUMENTS

| | | | |
|---|---|---|---|
| 3,697,881 A | * 10/1972 | Nakagome et al. | 329/306 |
| 4,059,805 A | * 11/1977 | de Laage de Meux et al. | 329/307 |
| 5,636,279 A | * 6/1997 | Katta et al. | 380/217 |
| 5,850,481 A | 12/1998 | Rhoads | 382/232 |
| 5,859,920 A | * 1/1999 | Daly et al. | 382/115 |
| 6,154,571 A | * 11/2000 | Cox et al. | 382/250 |
| 6,157,612 A | * 12/2000 | Weerackody et al. | 370/215 |

FOREIGN PATENT DOCUMENTS

| | | | | |
|---|---|---|---|---|
| JP | 9-191395 | * | 7/1997 | H04N/1/387 |

* cited by examiner

*Primary Examiner*—Leo Boudreau
*Assistant Examiner*—Tom Y. Lu
(74) *Attorney, Agent, or Firm*—Peyton C. Watkins

(57) ABSTRACT

In a method of embedding a hidden message in digital data, employing plurality of orthogonal random arrays of numbers as carriers for the bits of the hidden message, the random arrays are generated by applying a plurality of unique cyclical shifts to a single random array. In a preferred embodiment, the method is applied to digital image data and the cyclical shifts are defined as locations in a shift template, wherein the shift template has a highly peaked autocorrelation. The shift template is employed to recover the hidden message from the image without the need for calibration signals to indicate the boundaries of the hidden message.

5 Claims, 3 Drawing Sheets

LINEAR PROJECTIVE DATA EMBEDDING

FIELD OF THE INVENTION

The invention relates generally to the field of image processing, and in particular to embedding and extracting hidden messages in digital image data. This field is also referred to as data hiding, information hiding, watermarking and also steganography.

BACKGROUND OF THE INVENTION

U.S. Pat. No. 5,850,481, issued Dec. 15, 1998 to Rhoads, entitled "Steganographic System" discloses a method of embedding hidden messages in source data that can be described by the equation:

$$I'(x, y) = I(x, y) + \sum_{i=1}^{n} b_i \cdot R_i(x, y), \quad (1)$$

where I'(x,y) is the source data containing the hidden message,

I(x, y) is the source data, $b_i$ is the $i^{th}$ bit of the n-bit hidden message, and $R_i(x, y)$ are random arrays of numbers having the property that $$R_i(x, y) \cdot R_j(x, y) = \begin{cases} 1 & \text{where } i = j \\ 0 & \text{where } i \neq j \end{cases},$$

A simplified schematic block diagram illustrating this method is shown in FIG. 2. First an n-bit message is provided (10), then n random independent arrays $R_i(x,y)$ are generated (12). By independent is meant that the arrays are orthogonal in the sense of equation (1). Each of the random independent arrays $R_i(x,y)$ is then multiplied by the value of a corresponding bit in the n-bit message to produce n products(14). The n products are then added to produce a sum (16), and finally the sum is added to the original image data (18) to produce a modified image having an embedded message.

Each individual bit $b_i$ of the embedded message is recovered from the modified image data I'(x,y) by taking the dot product of the modified image data and the corresponding random independent array $R_i(x,y)$. The values of the recovered bits are assigned based on the amplitude of the dot product.

A problem with this method is that a separate random array of numbers $R_i(x,y)$ must be generated for each bit of the hidden message. One method disclosed for generating n random arrays is to scan a pure black image n times on a scanner where the gain has been turned up. For large hidden messages, this process becomes unduly burdensome, and if any systematic disturbances occur in the system, the resulting noise patterns will not be orthogonal. To locate the boundaries of the embedded message, embedded calibration signals are employed. These calibration signals use up bandwidth that could be used for the message.

There is a need therefore for an improved process for generating the random arrays employed in the hidden message embedding process.

SUMMARY OF THE INVENTION

The need is met according to the present invention by generating the random number arrays as follows.

$$R_i(x,y) = C(x - \alpha_i, y - \beta_i),$$

where C(x,y) is a random array of numbers, and $(\alpha_i, \beta_i)$ are cyclical shifts having the property that $(\alpha_i, \beta_i) \neq (\alpha_j, \beta_j)$ for $i \neq j$. Statistical theory can be used to show that a cyclically shifted version of a random array is orthogonal to the original random array and to other cyclically shifted versions of the random array.

This approach has the advantage that after generating one random number array C(x,y), the remainder may be easily generated simply by cyclically shifting the array by offsets $(\alpha_i, \beta_i)$. It has the additional advantage that it makes the computation simpler at the decoder. Instead of using n (typically 32, 64, . . . , 128 etc.) independent random number arrays, the method can now use one random number array. This complexity reduction is immensely beneficial to system developers attempting to improve algorithm speed. The invention may be applied to embedded systems in cameras, scanners or other systems where memory and processor performance are important.

In a preferred embodiment, the random array C(x,y) possesses a substantially flat Fourier amplitude spectrum and random phase.

In a further preferred embodiment, the cyclical shifts applied to the random array C(x,y) are represented by a shift template having a highly peaked autocorrelation. This embodiment has the additional advantages that the message can be recovered from the image without the need for embedded calibration signals, and the same method can be used to recover messages embedded by the technique disclosed by Rhoads in U.S. Pat. No. 5,850,481, or by the technique disclosed in U.S. patent application Ser. No. 08/848,112, filed Apr. 28, 1997 and allowed Sep. 23, 1999, entitled "Method For Generating An Improved Carrier For Use In An Image Data Embedding Application," by Honsinger et al. Thus messages embedded using two different proprietary embedding techniques can be recovered with the message extraction method of the present invention. This will be useful for example in image scanners that are likely to encounter embedded messages of different origin.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
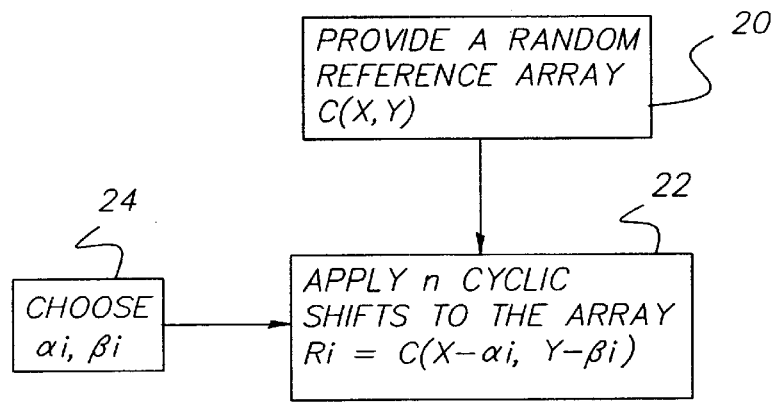
FIG. 1 is a schematic diagram illustrating the improved method of generating the random number arrays employed in the message embedding method according to the present invention.
Figure 2:
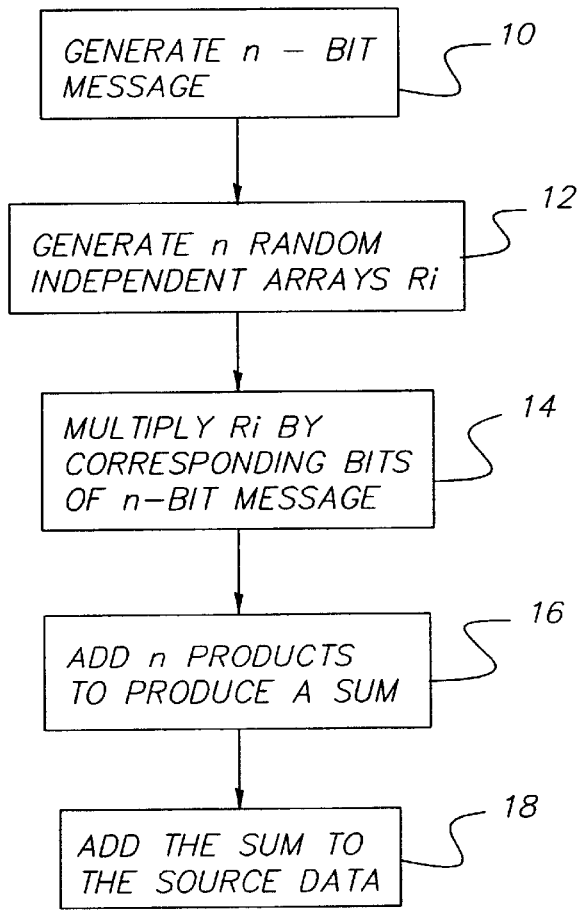
FIG. 2 is a simplified schematic block diagram illustrating the message embedding method of the prior art.

Referring to FIG. 1, according to the present invention, in a method of embedding a message in an image of the type employing n random independent arrays $R_i$, the n random arrays are generated by providing a first random array $C(x,y)$ (20), and generating the other arrays $R_i$ by cyclically shifting the first random array by offsets $(\alpha_i,\beta_i)$ (22). The term cyclically shifting as applied to a two dimensional array as used herein, means that when the array is shifted in the row direction (x direction) by an amount $\alpha$, the columns in the array are shifted to the right by the amount a and the columns that were shifted out of the array are placed column by column at the beginning of the array. This same process is repeated in the column direction (y direction) for the shift amount $\beta$ by shifting down row by row and replacing the rows that are shifted out of the array at the top of the shifted array. The shift amounts $(\alpha_i,\beta_i)$ are chosen (24) so that they are unique (i.e. $(\alpha_i,\beta_i) \neq (\alpha_j,\beta_j)$ for $i \neq j$.).

The first random array $C(x,y)$ is preferably generated by the technique disclosed in the above referenced U.S. patent application Ser. No. 08/848,112, filed Apr. 28, 1997 by Honsinger et al. wherein the random array, called a carrier signal, is designed in the Fourier frequency domain. In the Fourier domain, the value of the signal at each frequency is characterized by a complex number that can be represented as either a real/imaginary pair or as an amplitude/phase pair. The carrier signal is designed in the Fourier domain in such a way that the carrier's amplitude at each frequency is a constant and the carrier's phase at each frequency is a random number that is uniformly distributed between 0 and 360 degrees. The autocorrelation of such a carrier signal has a shape resembling a delta function with small sidelobes, which improves the integrity of the recovered message.

In comparison to the prior art method as described in equation (1), the method of the present invention can be described by the following equation.

$$I'(x, y) = I(x, y) + \sum_{i=1}^{n} b_i \cdot C(x - \alpha_i, y - \beta_i) \quad (2)$$

For example, the array $C(x,y)$ can be a 128×128 element array and n=130, employed to embed a message having 130 data bits in an image. It will be understood however that the invention can be employed generally to embed a message in any source data such as a sound or video data. In the case of a one dimensional data stream such as sound, the description is merely simplified by eliminating the second dimension.

Figure 3:
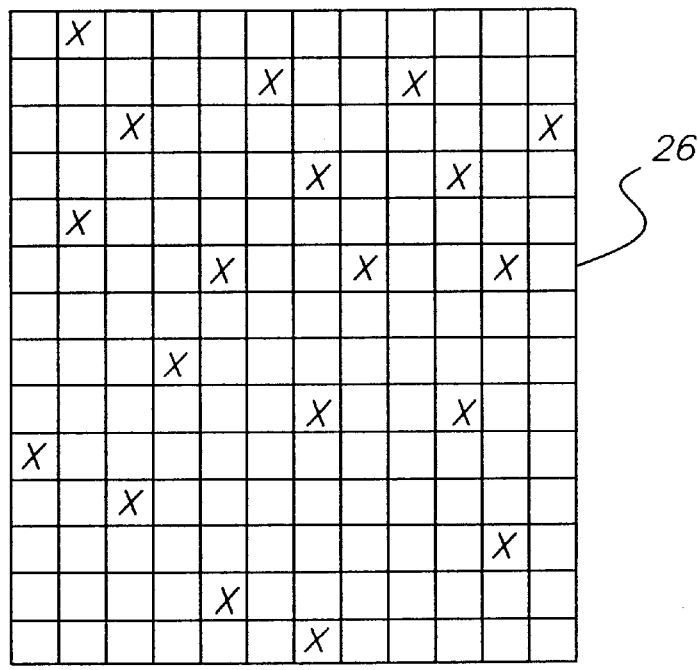
FIG. 3 shows a shift template employed with the present invention.

According to a preferred embodiment of the present invention, a shift template is provided. As shown in FIG. 3 the shift template 26 is represented as a rectangular array of shift amounts, also referred to herein as offsets $(\alpha_i,\beta_i)$ represented by the locations in the array. For example the x in the first row, second column of the shift template 26 indicates that the corresponding shift is (1,2). It is recognized that its implementation could be a set of ordered values in a lookup table indicating the amounts $(\alpha_i,\beta_i)$ of the cyclical shifts. The shift locations in the template correspond to the random arrays $R_i$ according to a prescribed relationship, for example they may be arranged in increasing order in predetermined raster or serpentine pattern. Preferably, the distance $((\alpha_i-\alpha_j)^2+(\beta_i-\beta_j)^2)^{0.5}$ between any two offsets in the shift template is greater than the autocorrelation width of $C(x,y)$. The autocorrelation width is defined herein as the twice the distance between the first side lobe maximum and the center of the delta function resulting from the autocorrelation of the random array $C(x,y)$. In the preferred 128×128 pixel implementation, this results in an autocorrelation width of 3 or 4 pixels. This helps to further insure the orthogonality of the cyclically shifted random arrays $R_i$.

Figure 4:
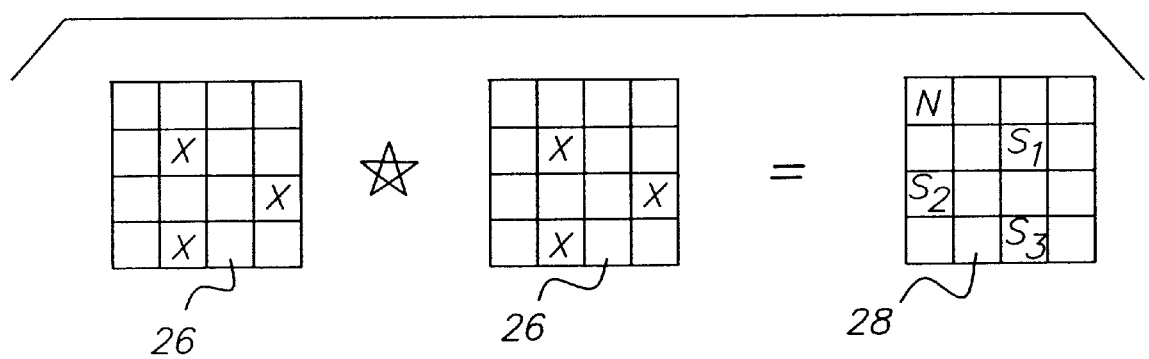
FIG. 4 shows the process of the autocorrelation of a simple shift template.

Referring to FIG. 4, the shift template 26 is preferably optimized so that its autocorrelation 28 is highly peaked. The autocorrelation operation is represented by a star in FIG. 4. At zero offset, the autocorrelation value will be a maximum. At other offsets, the autocorrelation value can vary between zero and the maximum. The result includes a zero offset value N (equal to the number of cyclical shifts represented by the template) and non zero offset values, referred to as sidelobes $S_i$. To say that the autocorrelation is highly peaked, means that the zero offset value N is significantly greater than any of the sidelobes $S_i$. For example, for a template having 130 data positions, the peak value N of the autocorrelated template would be 130, and for a highly peaked autocorrelation, the values of the sidelobes would preferably all be less than or equal to a small number, such as 5. For example, a poorly designed shift template would result if the data were located at the corners of a uniform rectangular grid, the sidelobes $S_i$ of an autocorrelation of this configuration would become indistinguishable from the zero offset value N.

Cyclically shifting the first random array according to the above described shift template to generate the other random arrays, enables the embedded message to be recovered from an image that has undergone cropping without the need for a separate calibration signal embedded in the image. It is assumed that rotation and magnification changes to the image are removed prior to recovery of the embedded message. Rotation and magnification can be corrected according to the method disclosed in U.S. patent application Ser. No. 09/452,415.

In a preferred embodiment of the present invention, the message bits are represented by plus and minus ones in a field of zeros. The minus ones corresponding to the zeros, and the plus ones corresponding to the ones in a binary bit stream.

Figure 5:
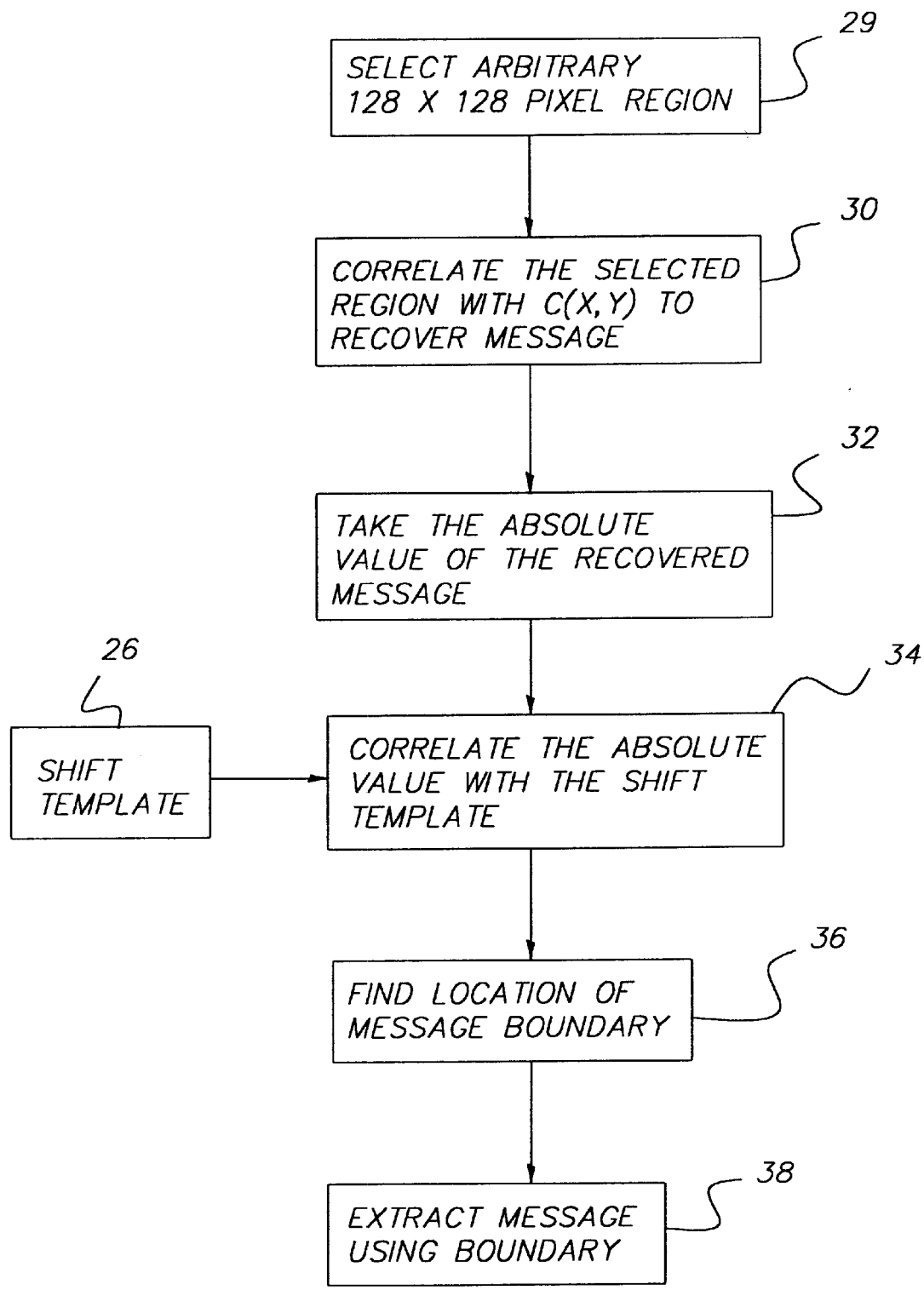
FIG. 5 is a flow chart illustrating one method of recovering an embedded message according to the present invention.

Referring to FIG. 5, the embedded message can be recovered from an image by selecting (29) an arbitrary 128×128 region of the cropped digital image and correlating (30) the arbitrary region with the carrier $C(x,y)$ to extract the message bits. The extracted message bits will be arranged in the pattern of a cyclically shifted version of the template (26). To rearrange the message bits in their proper order, the absolute value of the cyclically shifted message is taken (32) to form a positive valued cyclically shifted message. The positive valued cyclically shifted message is correlated (34) with the shift template (26) to form a cross correlation having a peak amplitude representing the distance to the message boundary. The distance to the message boundary is found (36) and employed (38) to extract the embedded message. The embedded message may be extracted either by reselecting the 128×128 region according to the location of the message boundary, or by cyclically shifting the recovered message in accordance with the location of the message boundary.

The present invention can be embodied in a computer program and the computer program can be embedded in a digital camera or scanner, or sold as a computer program product on a computer readable storage medium.

The invention has been described with reference to a preferred embodiment. However, it will be appreciated that variations and modifications can be effected by a person of ordinary skill in the art without departing from the scope of the invention.

PARTS LIST 10 provide n-bit message step
12 generated n random arrays step
14 multiply random arrays by values of corresponding bits step
16 add products step
18 add sum to
20 provide random array step
22 cyclic shift step
24 choose offsets step
26 shift template
28 autocorrelation of shift template
29 select 128×128 region step
30 correlate to extract message bits step
32 take absolute value step
34 correlated shifted message with shift template step
36 find distance to message boundary step
38 employ message boundary to extract message step

What is claimed is:

1. In a method of embedding a hidden message in digital image data, wherein the method is described by:

$$I'(x, y) = I(x, y) + \sum_{i=1}^{n} b_i \cdot R_i,$$

where I'(x,y) is the digital data containing the hidden message,

I(x,y) is the digital image data, n is the number of bits, where n is equal to or greater than 2, $b_i$ are the bits of the hidden message, and $R_j$ are random arrays of numbers having the property that $$R_i \cdot R_j = \begin{cases} 1 & \text{where } i = j \\ 0 & \text{where } i \neq j \end{cases},$$

the improvement comprising:

$$R_i = C(x - \alpha_i, y - \beta_i)$$

where C(x,y) is a array of random numbers, and $(\alpha_i, \beta_i)$ are offsets having the property that $(\alpha_i, \beta_i) \neq (\alpha_j, \beta_j)$ for $i \neq j$; wherein the distance $((\alpha_i - \alpha_j)^2 + (\beta_i - \beta_j)^2)^{0.5}$ between any two offsets is greater than the autocorrelation width of C(x,y).

2. The method claimed in claim 1, wherein C(x,y) possesses a substantially flat Fourier amplitude spectrum and random phase.

3. The method claimed in claim 1, wherein the method is employed in a digital camera or image scanner.

4. The method claimed in claim 1, wherein the offsets $\alpha_i, \beta_i$ are described as locations in a shift template, and the data bits $b_i$ are defined as plus and minus ones.

5. A computer-readable medium having a program embodied thereon, said program carrying out a method of embedding a hidden message in digital image data, wherein the method is described by:

$$I'(x, y) = I(x, y) + \sum_{i=1}^{n} b_i \cdot R_i,$$

where I'(x,y) is the digital data containing the hidden message,

I(x,y) is the digital image data, n is the number of bits, where n is equal to or greater than 2, $b_i$ are the bits of the hidden message, and $R_i$ are random arrays of numbers having the property that $$R_i \cdot R_j = \begin{cases} 1 & \text{where } i = j \\ 0 & \text{where } i \neq j \end{cases},$$

the improvement comprising:

$$R_i = C(x - \alpha_i, y - \beta_i),$$

where C(x,y) is a array of random numbers, and $(\alpha_i, \beta_i)$ are offsets having the property that $(\alpha_i, \beta_i) \neq (\alpha_j, \beta_j)$ for $i \neq j$; wherein the distance $((\alpha_i - \alpha_j)^2 + (\beta_i - \beta_j)^2)^{0.5}$ between any two offsets is greater than the autocorrelation width of C(x,y).

* * * * *